(12) United States Patent  (10) Patent No.: US 8,912,441 B2
Qin  (45) Date of Patent: Dec. 16, 2014

(54) SHIELDING DEVICE FOR PREVENTING WATER FLOWING INTO ELECTRONIC DEVICE

(75) Inventor: Gang-Qiang Qin, Shenzhen (CN)

(73) Assignees: Hong Fu Jin Precision Industry (ShenZhen) Co., Ltd., New Taipei (TW); Hon Hai Precision Industry Co., Ltd., New Taipei (TW)

( * ) Notice: Subject to any disclaimer, the term of this patent is extended or adjusted under 35 U.S.C. 154(b) by 253 days.

(21) Appl. No.: 13/416,122

(22) Filed: Mar. 9, 2012

(65) Prior Publication Data

US 2012/0255757 A1  Oct. 11, 2012

(30) Foreign Application Priority Data

Apr. 8, 2011  (CN) .......................... 2011 1 0088005

(51) Int. Cl.
*H01R 13/46* (2006.01)
*H02G 3/18* (2006.01)
*H02B 1/30* (2006.01)

(52) U.S. Cl.
USPC ............................................... 174/61; 174/64

(58) Field of Classification Search
CPC ......... H04Q 1/06; H04Q 1/062; H04Q 1/064; H04Q 1/066; H04Q 1/068; H02G 3/10; H02G 3/22
USPC .................... 174/535, 54, 60, 661, 61–64, 58
See application file for complete search history.

(56) References Cited

U.S. PATENT DOCUMENTS 2,957,040 A * 10/1960 Sharrar ......................... 174/492

* cited by examiner

*Primary Examiner* — Jeremy C Norris
(74) *Attorney, Agent, or Firm* — Novak Druce Connolly Bove + Quigg LLP

(57) ABSTRACT

A shielding device includes an enclosure sidewall. The enclosure includes two side plates, a top plate and a connecting plate connected to the top plate. The connecting plate defines a through hole to engage the cable. The top plate is slanted relative to the sidewall.

19 Claims, 4 Drawing Sheets

US 8,912,441 B2

SHIELDING DEVICE FOR PREVENTING WATER FLOWING INTO ELECTRONIC DEVICE

BACKGROUND

1. Technical Field

The present disclosure relates to shielding devices, more particularly to a shielding device for preventing water flowing into data center servers.

2. Description of Related Art

Blade and rack-mounted servers are popular form factors for data center servers. In order to achieve high performance, many rack-mounted servers are clustered in a sidewall and connected using fiber cables. The fiber cables may extend out of the data center servers from openings defined in the sidewall. Usually, the data center servers are exposed in outdoors, where water may flow into the interior of the data center servers from a gap between the openings and the fiber cables. Thus, the servers would be affected with damped.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
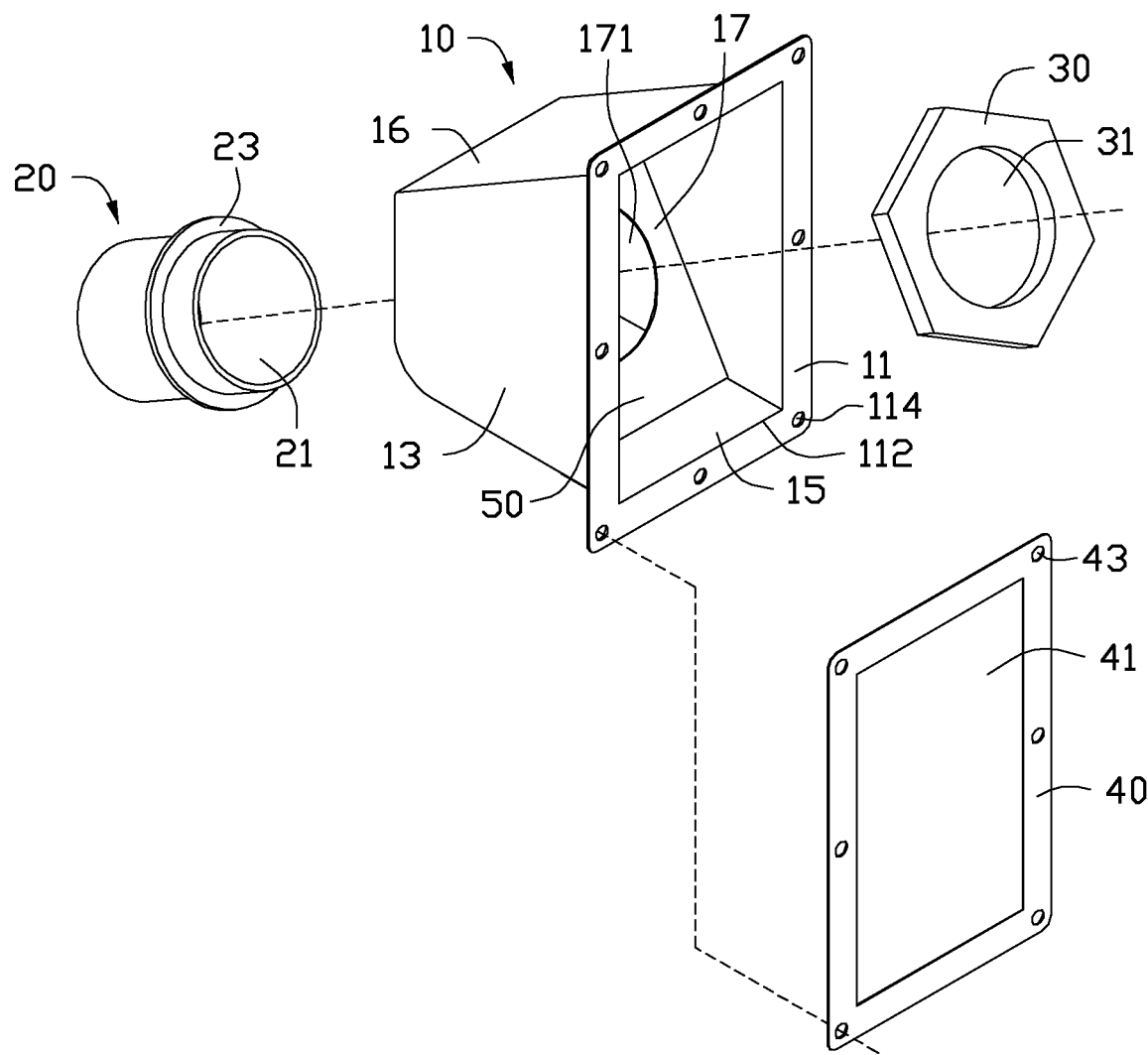
FIG. 1 is an exploded, isometric view of a shielding device in accordance with an embodiment.
Figure 2:
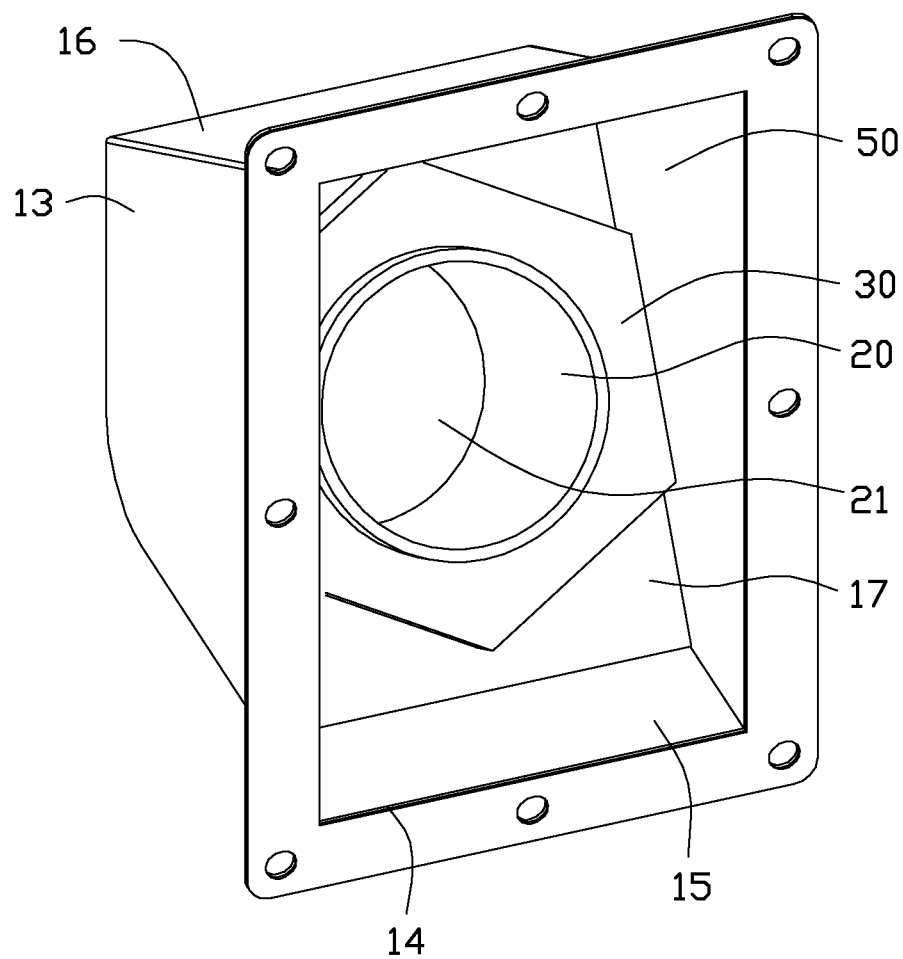
FIG. 2 is an assembled view of FIG. 1.

Referring to FIGS. 1 and 2, a shielding device in accordance with an embodiment includes an enclosure 10, a pipe 20 attached to the enclosure 10, an engaging member 30 attached to the pipe 20, and a mounting gasket 40.

The enclosure 10 includes a front panel 11, two side plates 13, a bottom plate 15, a top plate 16, and a connecting plate 17 connected to the bottom plate 15 and the top plate 16. The two side plates 13 are located on the opposite sides of the front panel 11. The front plate 11, the two side plates 13, the bottom plate 15, the top plate 16, and the connecting plate 17 cooperatively define a receiving space 50 for separating a cable (shown in FIG. 3) from outside. In one embodiment, the front plate 11 is rectangular-shaped; the two side plates 13 are substantially parallel to each other and perpendicular to the front plate 11. The bottom plate 15 is substantially perpendicular to the front plate 11, and an obtuse angle is defined between the bottom plate 15 and the connecting plate 17. The top plate 16 is slanted downwards relative to the front plate 11.

The front plate 11 defines an opening 112 and a plurality of securing holes 114 around the opening 112. In one embodiment, the opening 112 is rectangular-shaped, and the four edges of the opening 112 are connected to the two side plates 13, the bottom plate 15 and the top plate 16, respectively.

The connecting plate 17 defines a through hole 171 communicating with the receiving space 50. In one embodiment, the through hole 171 is circular, and the connecting plate 17 is substantially perpendicular to the top plate 16 (shown in FIG. 4).

The pipe 20 defines a receiving hole 21 for receiving a cable 60, and a step 23 protrudes from an outer surface of the pipe 20. In one embodiment, the pipe 20 is column-shaped, and has a less diameter than that of a through hole 171. The outer diameter of the step 23 is greater than that of the through hole 171.

The engaging member 30 defines an engaging hole 31. In one embodiment, the engaging member 30 is hexagon, the engaging hole 31 is circular, and a diameter of the engaging hole 31 is substantially equal to that of the through hole 171.

The mounting gasket 40 defines an aligning hole 41 and a plurality of mounting holes 43 around the aligning hole 41. The aligning hole 41 corresponds to the opening 112, and the plurality of mounting holes 43 corresponds to the plurality of securing holes 114. In one embodiment, the mounting gasket 40 is plastic, and has a same configuration to the front plate 11.

Figure 3:
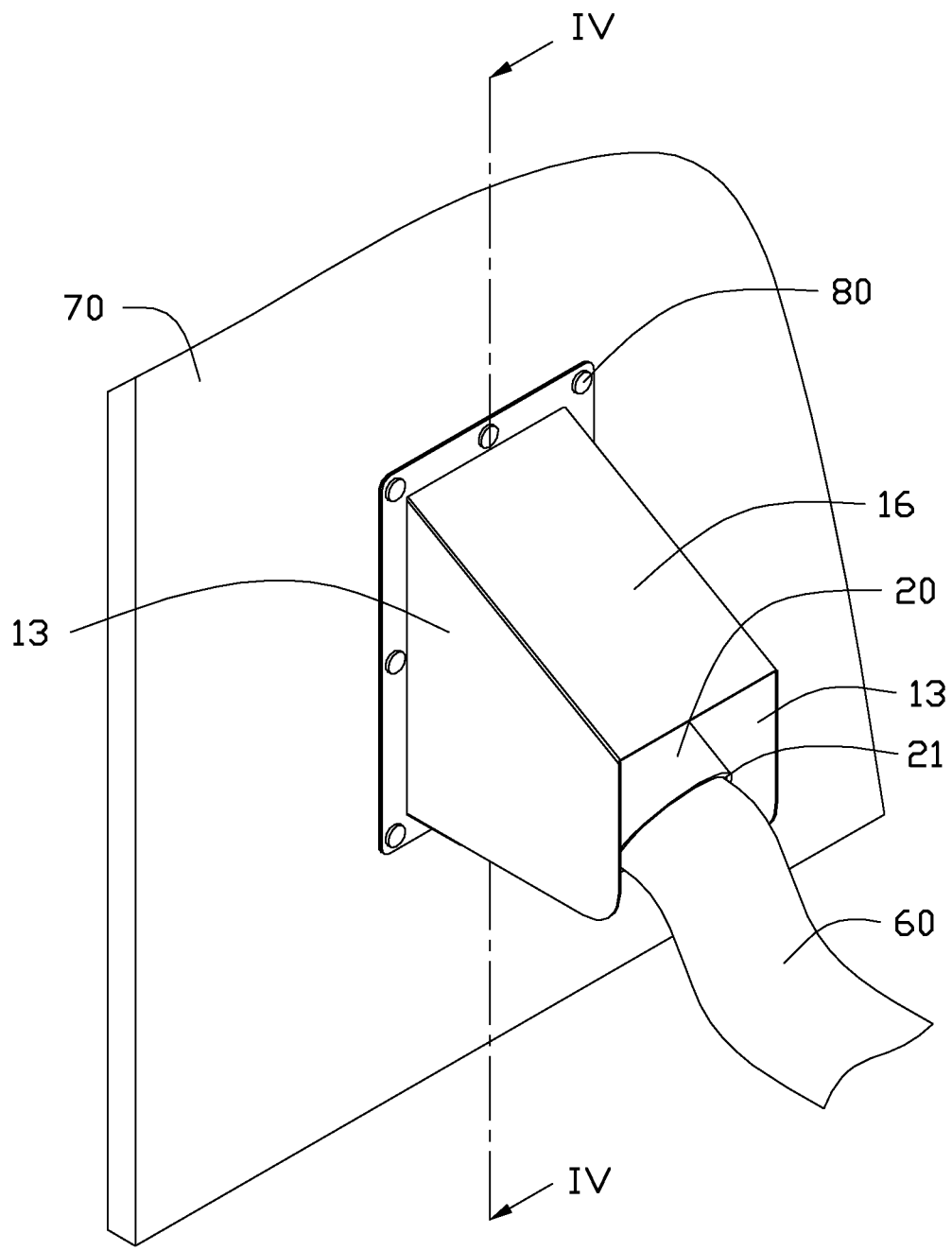
FIG. 3 is an assembled view of the shielding device and a sidewall in accordance with an embodiment
Figure 4:
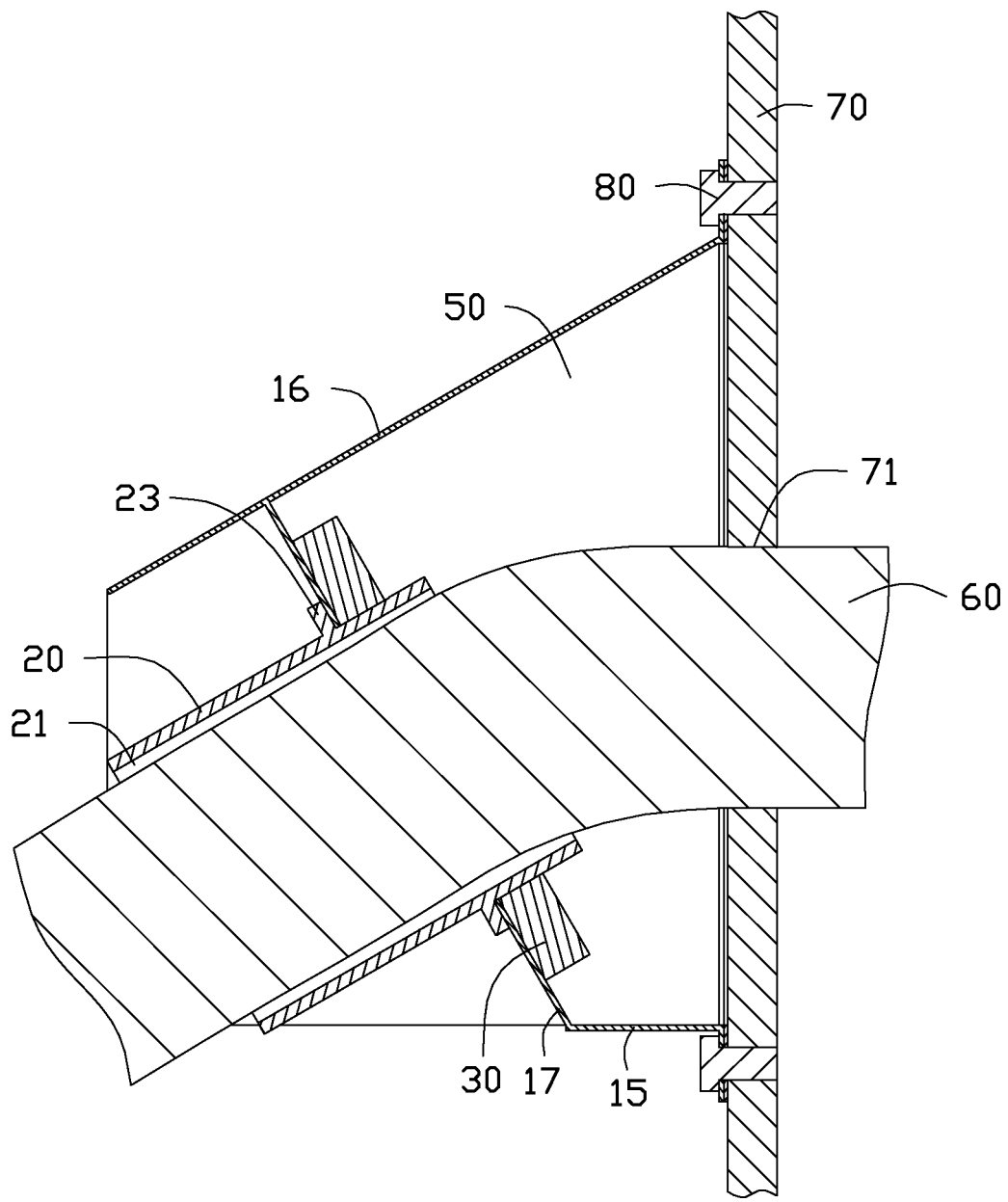
FIG. 4 is a partial cross-sectional view of FIG. 3 along line IV-IV.

Referring to FIGS. 2-4, the shielding device can be secured to a sidewall 70. The sidewall 70 may be an enclosure of dater center servers. The sidewall 70 defines a plurality of positioning hole (not shown) corresponding to the plurality of securing holes 114 and mounting holes 43. An entering opening 71 is defined in the sidewall 70 and allows the cable 60 to enter into the sidewall 70.

In assembly, the pipe 20 extends through the through hole 171 to enter into the receiving space 50, so that the step 23 abuts the outer surface of the connecting plate 17. The engaging member 30 is engaged with the pipe 20 to abut the inner surface of the connecting plate 17, to secure the pipe 20 to the connecting plate 17. The mounting gasket 40 is attached to the front plate 11. The plurality of mounting holes 43 is aligned with the plurality of securing hole 114, and the aligning hole 41 is aligned with the opening 112. The shielding device is attached to the sidewall 70, and the mounting gasket 40 abuts the sidewall 70. The plurality of mounting holes 43 is aligned with the plurality of positioning hole of the sidewall 70. A plurality of mounting members 80, such as screws, is engaged with the plurality of securing holes 114, the plurality of mounting holes 43 and the plurality of positioning hole. Thus, the shielding device is secured to the sidewall 70 to separate the entering opening 71 from the outdoors. The cable 60 extends through the corresponding the receiving hole 21, the through hole 171, the opening 112, the aligning hole 41 and the entering opening 71, to connect an electronic device (not shown) in the sidewall 70.

In use, when water flows onto the sidewall 70, the water would flow on the top plate 16 along the front plate 11, and flows out of the top plate 16 along the top plate 16. The entering opening 71 is separated from the outdoors by the receiving space 50 defined by the front plate 11, the two side plates 13, the bottom plate 15, the top plate 16 and the connecting plate 17. Water cannot flow into the sidewall 70 from a gap defined between the cable 60 and the entering opening 71.

In addition, the mounting gasket 40 is located between the front plate 11 and the sidewall 70. The front plate 11 can be closely adhered to the sidewall 70, for sealing a gap defined between the front plate 11 and the sidewall 70, and prevent water from flowing into the receiving space 50. The top plate 16 is slanted downwardly for the water flowing out of the top plate 16 faster. The connecting plate 17 is slanted relative to the bottom plate 15 with less water flowing thereon.

In one embodiment, the shielding device includes the top plate 16 and the connecting plate 17 connected to the top plate 16, and without the bottom plate 15, the two side plates 13, and the front plate 11. The top plate 16 and the connecting plate 17 cooperatively define the receiving space 50. When the shielding device is secured to the sidewall 70, the top plate 16 and the connecting plate 17 are directly secured to the sidewall 70, and then the entering opening 71 can be separated from the outside by the top plate 16 and the connecting plate 17.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A shielding device comprising:
an enclosure comprising a bottom plate, two side plates, a top plate and a connecting plate connected to the top plate and the bottom plate; the two side plates being substantially parallel to each other and located on opposite sides of the bottom plate; and the connecting plate defining a through hole configured to receive a cable;
wherein the top plate is slanted relative to a sidewall of an electronic device.

2. The shielding device of claim 1, wherein the connecting plate is substantially perpendicular to the top plate.

3. The shielding device of claim 2, wherein the enclosure further comprises a front plate; and the front plate, the bottom plate, the connecting plate, the two side plates, and the top plate cooperatively define a receiving space.

4. The shielding device of claim 3, wherein an obtuse angle is defined between the connecting plate and the bottom plate.

5. The shielding device of claim 3, wherein the bottom plate is substantially perpendicular to the front plate.

6. The shielding device of claim 3, further comprising a mounting gasket located between the front plate and the sidewall, and the mounting gasket being attached to the front plate.

7. The shielding device of claim 6, wherein the mounting gasket is plastic.

8. The shielding device of claim 1, further comprising a pipe, and the pipe being secured to the connecting plate.

9. The shielding device of claim 8, further comprising an engaging member, and the pipe extending through the through hole to engage with the engaging member.

10. The shielding device of claim 9, wherein the engaging member is hexagon.

11. An apparatus comprising:
an electronic device comprising a sidewall, the sidewall defining an entering opening for a cable extending through the sidewall;
an enclosure attached to a sidewall, the enclosure comprising a front plate attached to the sidewall, two side plates, a bottom plate, a top plate, and a connecting plate connected to the bottom plate and the top plate; the connecting plate being slanted to the bottom plate and substantially perpendicular to the top plate, and the front plate, the bottom plate, the connecting plate, the two side plates, and the top plate cooperatively defining a receiving space;
wherein the top plate is slanted relative to the sidewall.

12. The apparatus of claim 11, wherein an obtuse angle is defined between the connecting plate and the bottom plate.

13. The apparatus of claim 11, wherein the bottom plate is substantially perpendicular to the front plate.

14. The apparatus of claim 11, further comprising a mounting gasket located between the front plate and the sidewall, and the mounting gasket being adapted to seal a gap between the front plate and the sidewall.

15. The apparatus of claim 14, wherein the mounting gasket is plastic.

16. The apparatus of claim 14, wherein the mounting gasket is rectangular.

17. The apparatus of claim 11, further comprising a pipe, and the pipe being secured to the connecting plate.

18. The apparatus of claim 17, further comprising an engaging member, and the pipe extending through the through hole to engage with the engaging member.

19. The apparatus of claim 18, wherein the engaging member is hexagon.

* * * * *